United States Patent
Benayoun et al.

(10) Patent No.: US 7,254,139 B2
(45) Date of Patent: Aug. 7, 2007

(54) DATA TRANSMISSION SYSTEM WITH MULTI-MEMORY PACKET SWITCH

(75) Inventors: Alain Benayoun, Gagnes sur Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 1061 days.

(21) Appl. No.: 10/325,689

(22) Filed: Dec. 20, 2002

(65) Prior Publication Data

US 2003/0133447 A1     Jul. 17, 2003

(30) Foreign Application Priority Data

Dec. 21, 2001   (EP) ................... 01480139

(51) Int. Cl.
*H04L 12/28* (2006.01)
(52) U.S. Cl. .............. 370/413; 370/428; 370/465
(58) Field of Classification Search ........... 370/389, 370/392, 401, 402, 412, 413, 428, 465
See application file for complete search history.

(56) References Cited

U.S. PATENT DOCUMENTS

| | | | |
|---|---|---|---|
| 5,557,607 A * | 9/1996 | Holden | 370/413 |
| 5,757,795 A * | 5/1998 | Schnell | 370/392 |
| 5,982,771 A * | 11/1999 | Caldara et al. | 370/389 |
| 6,195,335 B1 * | 2/2001 | Calvignac et al. | 370/236 |
| 6,205,145 B1 * | 3/2001 | Yamazaki | 370/395.65 |
| 6,345,040 B1 * | 2/2002 | Stephens et al. | 370/232 |
| 2004/0196859 A1 * | 10/2004 | Benner | 370/413 |

* cited by examiner

*Primary Examiner*—Hassan Kizou
*Assistant Examiner*—Bo Hui A Zhu
(74) *Attorney, Agent, or Firm*—Pastel Law Firm; Christopher R. Pastel (57) ABSTRACT

A data transmission system comprising a packet switch module interconnecting LAN adapters, a plurality of input and output ports connected to the LAN adapters such that each pair of input and output ports defines a crosspoint within the switch module, and a memory block located at each crosspoint of the switch module for storing at least one data packet. At each clock time, a scheduler causes a data packet stored in a memory block, among all memory blocks corresponding to a given output port, to be transferred to that output port. The system further comprises a configuration interface mechanism for sending configuration data to the memory control means of memory blocks located at predetermined crosspoints such that a packet received by corresponding input ports from an input adapter having a speed n times faster than an input adapter transmitting to a single input port is transferred to corresponding output ports at a speed which is n times the transfer speed between a single input port and a single output port.

13 Claims, 7 Drawing Sheets

DATA TRANSMISSION SYSTEM WITH MULTI-MEMORY PACKET SWITCH

FIELD OF THE INVENTION

The present invention relates to the transmission of data packets such as Asynchronous Transfer Mode (hereinafter referred to as "ATM") packets between Local Area Networks (hereinafter referred to as "LANs") interconnected by a switch engine, and relates in particular to a data transmission system based upon a speed expandable multi-memory packet switch.

BACKGROUND OF THE INVENTION

LANs, such as Ethernet or Token-Ring networks, are generally interconnected through a hub. A hub is a system comprised of Local Area Network (hereinafter referred to as "LAN") adapters that communicate through a switch card containing a switch engine.

One type of switch engine is known as a shared memory switch. A shared memory switch is a device wherein packets received by input ports are stored into memory locations, the addresses of which are determined by queues containing packet destination addresses, with packets being transmitted on output ports as destination addresses are dequeued. Although such a switch provides a relatively low cell-lost rate, it presents a bottleneck due to the memory bandwidth that is needed, segregation of memory space, and centralized control of the memory which causes switch performance to degrade as switch size increases. A traditional approach to designing a large shared memory switch has been to first design a feasibly sized shared memory switch module, and to then interconnect a plurality of such modules in order to build a large switch. A design of this type is known to cause degradation in the performance of systems having a shared memory architecture inasmuch as a growth in switch size will result in a memory access controller having a corresponding increase in the extent of centralized control functions and memory operations, thereby significantly reducing access to shared memory. An expandable switch approach to packet switch architecture comprising a plurality of shared memory switches organized in a single stage preceded by a buffer-less interconnection network does not allow global sharing of memory space among all inputs and outputs. It is known that such an approach does not provide optimum memory utilization, as memory belonging to a group of output ports may overflow under unbalanced or bursty traffic conditions.

Another problem of a shared memory switch may arise when the speed of the switch is increased, as input adapters will operate at an increased speed which may be several times the speed used for transferring data packets through the switch engine. In contemporary designs, such a problem is solved by grouping four input ports which are specifically designed to form a link, which is also known as "link paralleling". A drawback of this particular solution is that a group of two or three, or a number of input ports other than four may not be utilized to form a link. Accordingly, a different sized link adapted to new adapters would require redesign of the link paralleling function of the switch, i.e. a redesign of the switch engine itself.

It is believed, therefore, that a data transmission system which provides the many advantages taught herein would obviate many of the problems and limitations described hereinabove, and would constitute a significant advancement in the art.

OBJECTS AND SUMMARY OF THE INVENTION

It is a primary object of the present invention to enhance the art of data transmission systems.

It is another object of the invention to provide a data transmission system which functions in a new and unique manner, compared to known such systems.

It is yet another object of the invention to provide a packet switch module which provides speed expansion without requiring redesign of the module.

It is yet another object of the invention to provide a packet switch module which provides speed expansion using any input/output ports insofar as no centralized shared memory is required, but rather, a memory associated with each crosspoint of the module is utilized.

In accordance with one embodiment of the invention, there is provided a data transmission system comprising a plurality of LANs interconnected by a hub, a plurality of LAN adapters within the hub connected to the LANs and a packet switch module, wherein a packet transmitted by any of the plurality of LAN adapters to the packet switch module includes a header containing at least a destination address of any of the plurality of LAN adapters to which the packet is to be forwarded, wherein the switch module comprises a plurality of input ports and a plurality of output ports, both being connected to the plurality of LAN adapters, wherein each input port and output port define a crosspoint within the switch module, a memory block located at each the crosspoint of the switch module, wherein the memory block includes a data memory unit adapted for storing at least one data packet, memory control means for determining from a header of a received data packet whether the packet is to be forwarded to an output port associated with the crosspoint and for storing the data packet into the data memory unit, data control means for causing at a clock time a data packet stored in a data memory unit of a memory block, among all memory blocks corresponding to the output port, to be transferred to the output port, and a configuration interface mechanism adapted for sending configuration data to the memory control means of the memory blocks, wherein a packet received by a plurality of input ports from an input adapter having a speed n times faster than an input adapter transmitting to a single input port is transferred to a corresponding plurality of output ports at a speed which is n times the transfer speed between one input port and one output port.

BRIEF DESCRIPTION OF THE DRAWINGS

The above and other objects, features and advantages of the present invention will be better understood by reading the following more particular description of the invention in conjunction with the accompanying drawings wherein.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

Figure 1:
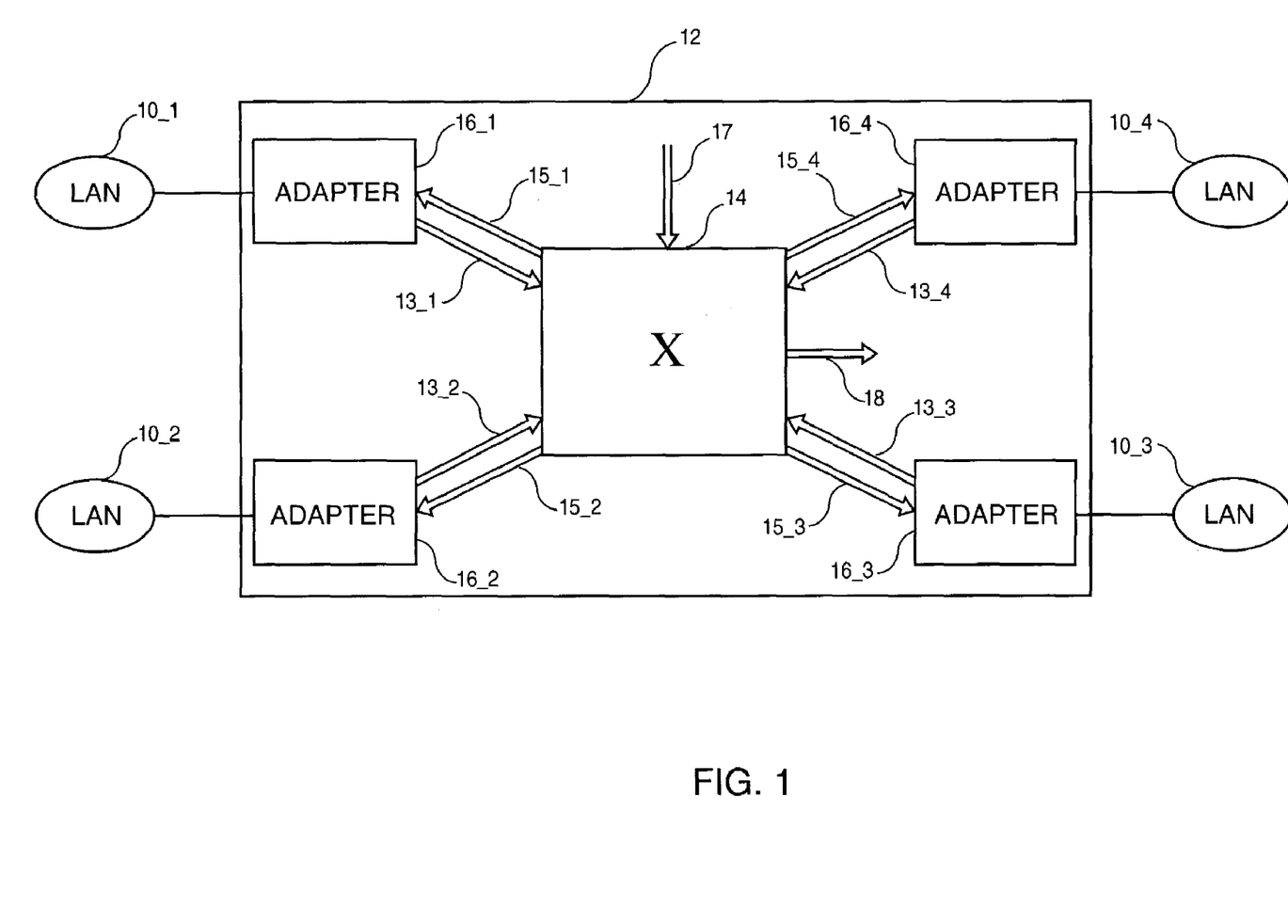
FIG. 1 is a schematic diagram showing a data transmission system including four LANs interconnected by a hub according to one embodiment of the invention.

The present invention may be implemented as shown in FIG. 1 wherein a plurality of LANs 10_1, 10_2, 10_3, 10_4 are interconnected using hub 12 that includes Packet switch 14. The LANs may be comprised of ATM, Ethernet, or Token-Ring types. Each one of the LANs is connected to packet switch 14 in hub 12 using LAN adapter 16_1 for LAN 10_1, 16_2 for LAN 10_2, 16_3 for LAN 10_3, and 16_4 for LAN 10_4. Each adapter 16_1 to 16_4 is connected to packet switch 14 using a data bus in 13_1 to 13_4 and a data bus out 15_1 to 15_4, respectively. Connected to packet switch 14, are input expansion bus 17, and output expansion bus 18 which are respectively used for increasing the number of input ports, and the number of output ports as explained hereinbelow.

Data buses in 13_1 to 13_4 carry data packets coming from LAN adapters 16_1 to 16_4, and data buses out 15_1 to 15_4 carry outgoing data packets to LAN adapters 16_1 to 16_4, respectively. As explained hereinbelow, each incoming packet includes a self-routing header inserted by one of LAN adapters 16_1 to 16_4, this header being used to independently process the data packet through different stages of the switch module.

Figure 2:
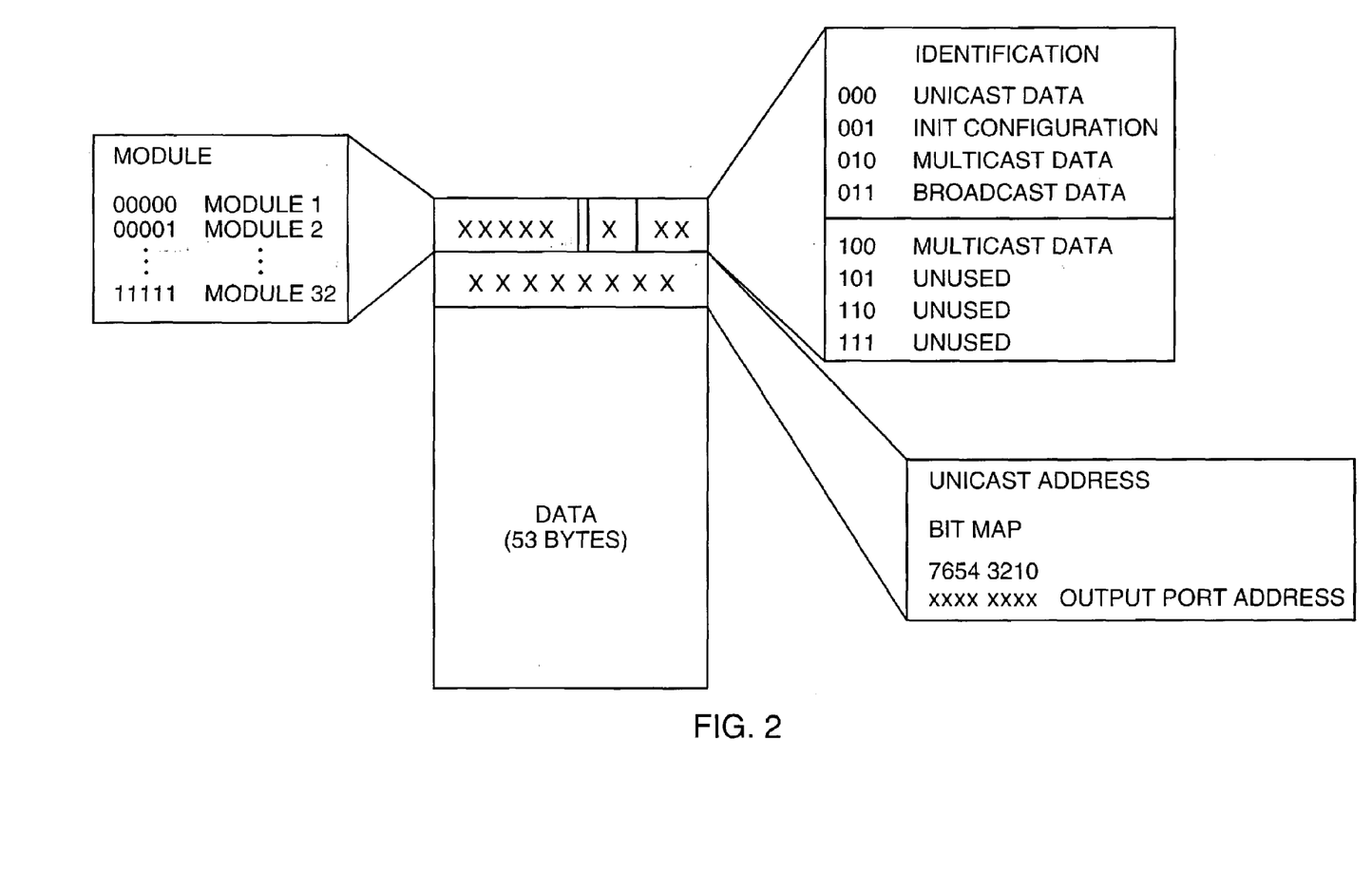
FIG. 2 is a diagram showing a data packet with a header having two bytes added by an adapter according to one embodiment of the invention.

FIG. 2 shows the format of data packets exchanged between LAN adapters through the packet switch. It is assumed that a data packet is comprised of 53 bytes. A header comprised of 2 bytes is added to each packet by an adapter. The first byte of the header is comprised of an identification field of three bits (bits 0-2) and a module address field of 5 bits (bits 3-7). The second byte of the header is used in a unicast configuration and provides, in bit map form, a destination output port selection.

Figure 3:
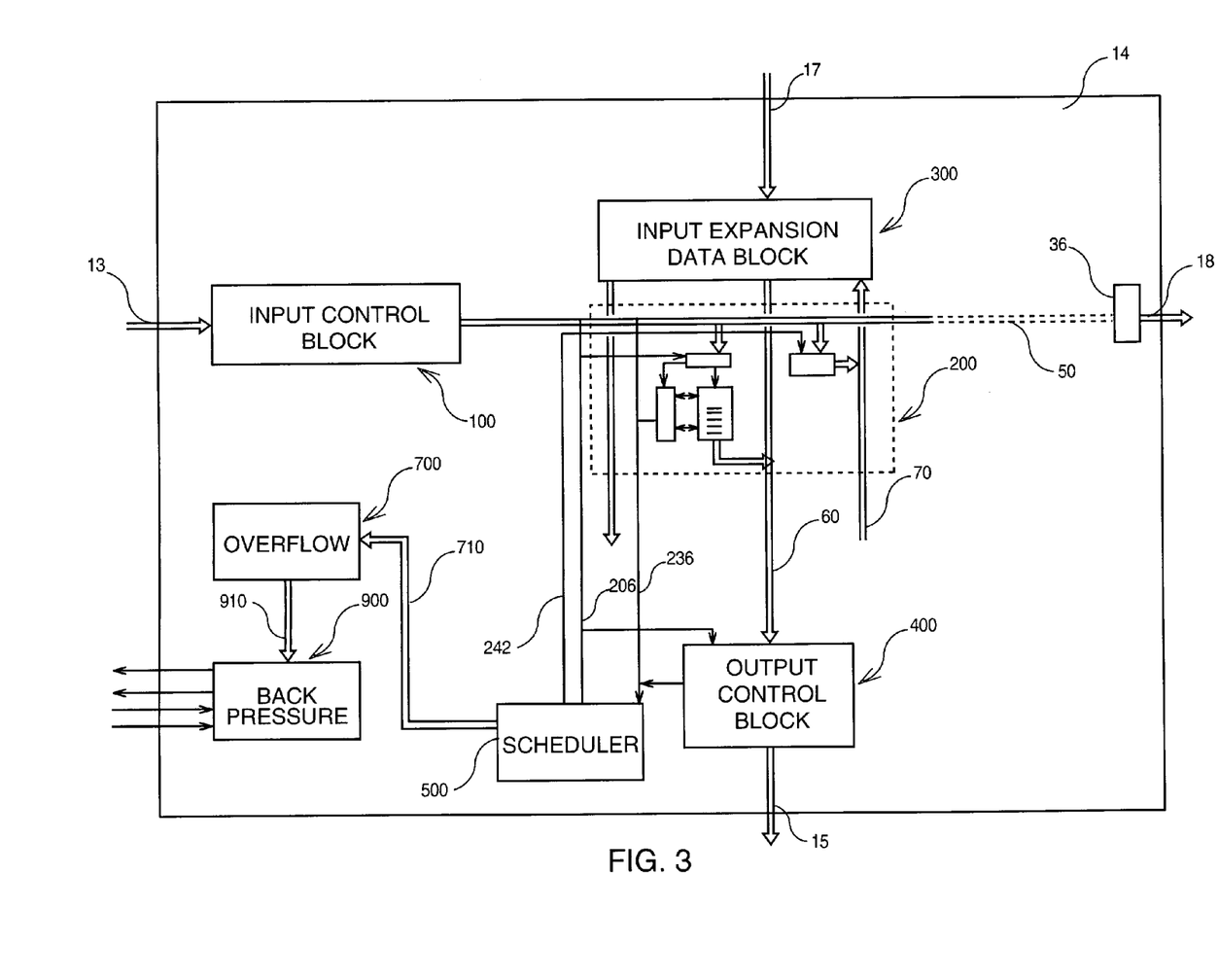
FIG. 3 is a diagram showing a packet switch module being utilized in a packet data flow according to one embodiment of the invention.

In FIG. 3 there is shown a general data flow structure of switch module 14 according to the invention, comprising a plurality of input buses, in one example data bus in 13, respectively connected to switch input ports, and a plurality of output buses, in one example data bus out 15, respectively connected to switch output ports.

For each crosspoint, in one example a crosspoint defined by data bus in 13 and data bus out 15, there are, as shown in FIG. 3, input control block 100, memory block 200, input expansion data block 300, and output control block 400. Input control block 100 comprises data bus in 13 for receiving data packets, and means for storing the incoming data packets according to their respective destinations and releasing these packets into distributed data bus 50 which is common for memory blocks which correspond to data bus in 13. Output control block 400, which receives data packets from interval output bus 60, validates these data packets, stores these into an output memory unit, and releases the data packets on data bus out 15 which is common for memory blocks which correspond to data bus out 15. Input expansion data block 300 is connected to input expansion bus 17 and is common to memory blocks which correspond to data bus out 15. Memory blocks corresponding to data bus in 13 are connected to distributed data bus 50, which is connected to output expansion bus 18 using gate 36. Memory blocks corresponding to data bus out 15 are connected to output data bus 60 and to overflow data bus 70, the function of which is explained hereinbelow.

Data packets which are received by memory block 200 from input control block 100 are analyzed and stored into memory, and are released to output control block 400 through output data bus 60. The data packets are then sent by output control block 400 over data bus out 15. These operations are synchronized and controlled by scheduler 500 associated with output control block 400 using control lines such as lines 206, 236 and 242.

Figure 4:
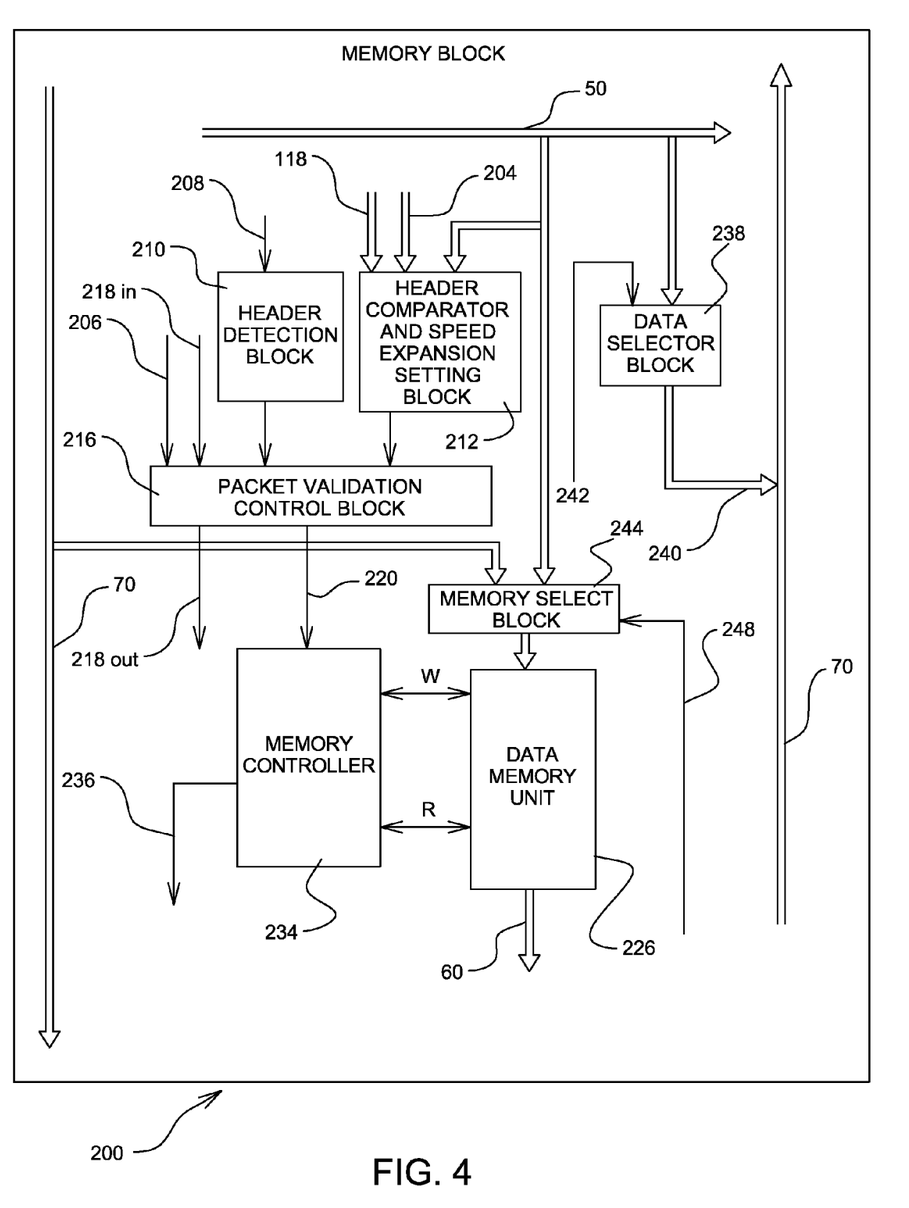
FIG. 4 is a diagram showing a memory block located at crosspoints of a packet switch module according to one embodiment of the invention.

In FIG. 4, memory block 200 is shown, comprising memory select block 244, header detection block 210, header comparator and speed expansion setting block 212, memory controller 234, data memory unit 226, data selector block 238, and packet validation control block 216.

Figure 5:
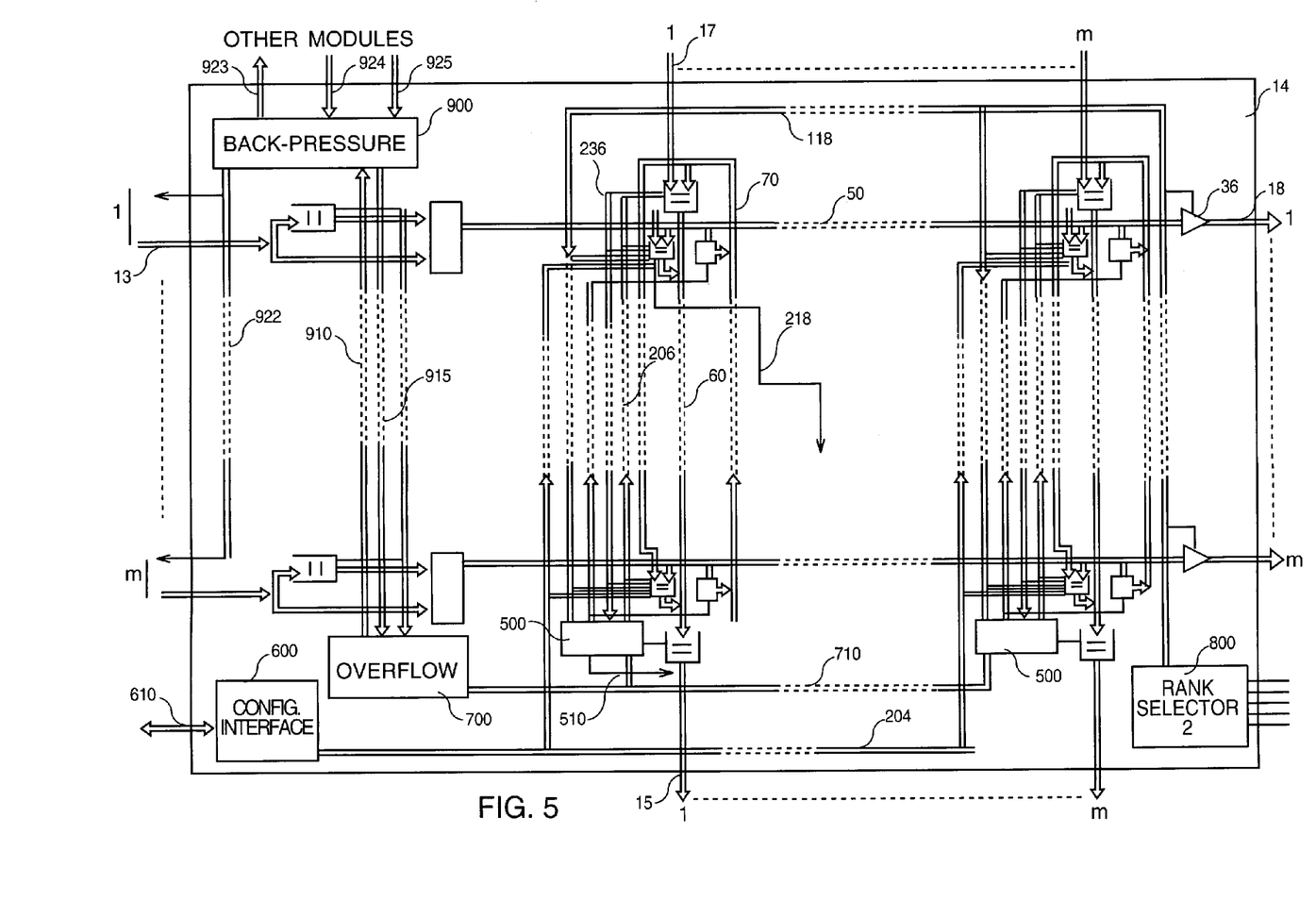
FIG. 5 is a diagram showing the architecture of a packet switch module according to one embodiment of the invention.

The header comparator and speed expansion setting block 212 performs the functions of storing and reading a configuration data memory address from configuration interface mechanism 600, storing a module rank from rank selector 800, analyzing data packet type (e.g. Multicast, Unicast, etc.), and authorizing or not authorizing reception of an incoming data packet according to destination data packet address (600 and 800 are shown in FIG. 5).

At initialization time, header comparator and speed expansion setting block 212 receives a switch module rank from rank selector 800 through bus 118. The module rank is used to determine a global physical address of each output port of the switching system. Each header comparator and speed expansion setting block connected to an output port of a given column has the same decoding address. In one example, each switch module is an 8×8 port module with the first column corresponding to output port 1 having decoding address '0', the second column having decoding address '1', and so on, until column 7. It should be noted that the switch module could be an m×m port module, with m different from 8.

If a switch module is single, then the decoding address on each column is unchanged. However, in port expansion with several modules interconnected together, the first column of a module decodes the address range (0-7), the second column of a module decodes the address range (8-15), the third column of a module decodes the address range (16-23), and so on, until the last column of a module. If there are n columns of modules, block 212 assigns an offset of 8×k to the output port address in the module, with k being 0 to n−1.

Another function of the header comparator and speed expansion setting block 212 is to allow modification of a pre-set internal output port memory address through a configuration interface. This function is used in internal speed expansion mode, where two or more output ports or columns are combined in order to increase data throughput of the port. Configuration interface mechanism 600 configures the memory block using configuration bus 204. Header detection block 210 detects the beginning of each incoming data packet, and receives clocking signal 208 at each clock time.

Packet validation control block 216 receives control signals from block 210 and block 212, receives write data validation signal 218 in from a memory block of a previous column and validation signal 206 from scheduler 500 to authorize memory controller 234, using signal 220, to store an incoming data packet into data memory unit 226, and generates write data validation signal 218 out which is sent to a packet validation control block of a memory block at the intersection of the next column and the next row.

Data validation block 244 selects either distributed data bus 50 or overflow data bus 70 depending on control signal 248 driven by scheduler 500. By default, distributed data bus 50 is connected to data memory unit 226 until an overflow is detected.

Data memory unit 226 stores and releases data packets under the control of memory controller 234. Memory controller 234 performs the functions of controlling address release, enqueue and dequeue, generating read and write signals, and generating memory overflow signal 236 to scheduler 500 when an overflowing data memory unit is detected.

One overflow data bus per output, in one example overflow data bus 70, is connected to memory blocks along internal output data bus 60 to allow reassignment of overflow data packets to another memory block. Reassignment of overflow data packets is performed by scheduler 500 activating signal 242 controlling overflow connection block 238 which, in one example, is an AND circuit connecting distributed data bus 50 to overflow data bus 70 through bus 240. Scheduler 500 makes a decision after receiving flow control signals, in one example flow control signal 236, from memory blocks connected on the same output port which overflow during a given data packet time. The decision is to determine usable memory where an overflow data packet may be stored when the scheduler has prevented the overflow data packet from being stored into an overflowing data memory unit. This provides significant utility, as the data packet is re-routed to another memory block which is not overflowing of the same output port.

As described hereinabove, write data validation signal 218 out is generated for a packet validation control block at the intersection of the next column and the next row if internal speed expansion is being used. Write data validation signal 218 out will be generated if block 212 has been configured as a speed expansion master block using bus 204. Incoming signal 218 in is validated by a packet validation control block at the intersection of the next column and the next row, if a corresponding speed expansion setting block at that intersection has been configured as a slave internal speed expansion block using a configuration bus.

An important feature of the present invention is the use of a scheduler for each output port of the packet switch, in one example scheduler 500 as shown in FIG. 5 and described hereinbelow, rather than a centralized scheduling mechanism as used in a crossbar switch.

The functions of scheduler 500 comprise receiving incoming information from column memory blocks to which scheduler 500 is connected, activating validation of an incoming data packet for a selected memory block, and determining an outgoing data packet by choosing a next memory block according to a round-robin scheduling mechanism. The selection of an outgoing data packet may also be performed using a mechanism based on priority selection and/or any other type of selection mechanism. Additional functions of scheduler 500 comprise sending data packet selection signal 510 to other schedulers if scheduler 500 is configured as a master scheduler for use in internal speed expansion mode, controlling memory overflow, performing flow control at output ports, and reporting flow control signal 710 to an overflow control mechanism 700, and therefore alerting backpressure mechanism 900.

Configuration interface mechanism 600 shown in FIG. 5 is a mechanism controlling the configuration of each column output port. As input, configuration interface mechanism 600 receives commands (e.g. init parameters, decoding addresses, status requests, etc.) from a traffic management system running on a control point system card on bus 610. As output, configuration interface mechanism 600 interfaces with memory blocks, in one example memory block 200, and schedulers, in one example scheduler 500, through bus 204.

The functions of configuration interface mechanism 600 comprise configuring the packet switch module and initializing the speed expansion function.

Upon reception of a "configure packet switch module" command on bus 610 from the traffic management system, configuration interface mechanism 600 writes to each column memory block, in one example block 200, a unique data packet address using bus 204. It should be noted that, in speed expansion mode, this address will be the same for ports linked together, i.e. ports 1, 2, 3 and 4 on one hand, and ports 6 and 7 on the other hand, in the example shown in FIG. 6, as explained hereinbelow.

Upon reception of a "initialize the speed expansion function" command on bus 610 from the traffic management system, configuration interface mechanism 600 links several different memory blocks, in one example block 200, together by informing these blocks that they are in speed expansion mode, and that the first one of the linked memory blocks is a master, whereas the other ones are slaves, as explained hereinbelow with reference to FIG. 6.

It should be noted that it is of no consequence whether a "configure packet switch module" command is received before, after, or simultaneously with a "initialize the speed expansion function" command.

Assuming that an input adapter has a speed which is n times faster than the current speed of other adapters, the speed expansion mode comprises receiving a packet sent by the input adapter into n memory blocks which are located at crosspoints $x/y$, $x+1/y+1$, ..., $x+n-1/y+n-1$ of the packet switch module, wherein $x$, $x+1$ ..., $x+n-1$ designates the rank of the row, and whereas $y$, $y+1$ ..., $y+n-1$ designates the rank of the column.

By way of example, in a switch with 8×8 input/output ports that does not utilize the present invention, the first column corresponding to output port 1 would have the decoding address '1'. The second column would have the decoding address '2' ... and so on, until column 8. When utilizing the present invention, however, the configuration interface mechanism would allow the traffic management system to modify the address of each column. In the example shown in FIG. 6, the packet switch module would have the following configuration:

Port_1: Decoding address '1'
Port_2: Decoding address '1'
Port_3: Decoding address '1'
Port_4: Decoding address '1'
Port_5: Decoding address '2'
Port_6: Decoding address '3'
Port_7: Decoding address '3'
Port_8: Decoding address '4'

Figure 6:
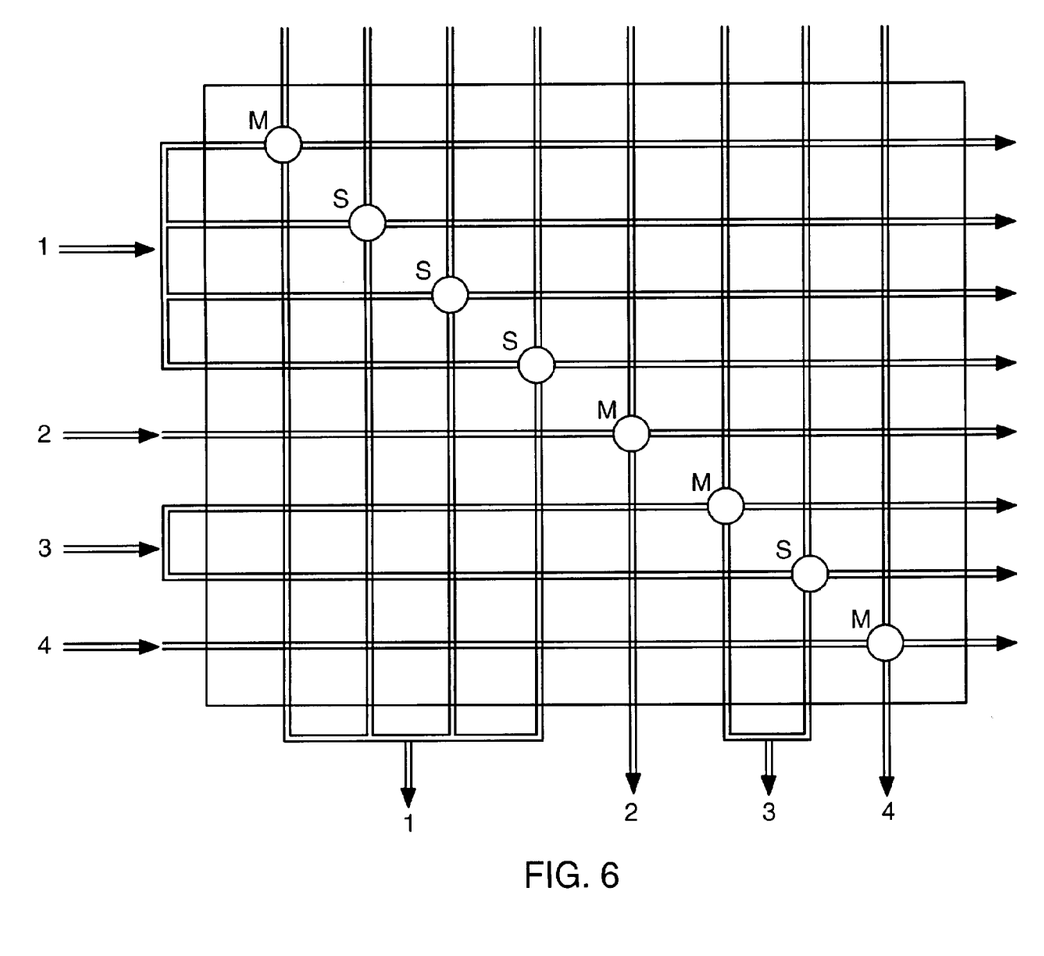
FIG. 6 is a diagram showing memory blocks in a packet switch module being utilized to achieve speed expansion between input and output ports according to one embodiment of the invention.

As shown in FIG. 6, for input adapter 1, memory blocks transmitting to the same destination address are located at crosspoints 1/1, 2/2, 3/3, and 4/4. This address corresponds to output ports 1, 2, 3, and 4. The memory block located at crosspoint 1/1 is a master, whereas memory blocks located at crosspoints 2/2, 3/3, and 4/4 are slaves. It should be noted that the master is the memory block which detects a packet cell address as opposed to the slaves which receive only data bytes.

For input adapter 3, memory blocks transmitting to the same destination address are located at crosspoints 6/6 and 7/7. This address corresponds to output ports 6 and 7. The memory block located at crosspoint 6/6 is a master, whereas the memory block located at crosspoint 7/7 is a slave.

For input adapters 2 and 4, which are not in speed expansion mode, memory blocks located at crosspoints 5/5 and 8/8 transmit to destination addresses that respectively correspond to output ports 5 and 8. It should be noted that, in the present example, these memory blocks are also masters, but are without slaves.

Accordingly, input adapter 1 is four times faster than a single input port since it is connected to four ports, 1, 2, 3, and 4, at both the input and the output of the switch module. Input adapter 3 is two times faster than a single input port as it is connected to two ports, both input and output, of the switch module.

Describing this in further detail, configuration interface mechanism 600 sends information using bus 204 to header comparator and speed expansion setting block 212 of each memory block, for each output port. Using bus 610, the traffic management system provides information regarding module physical address, row/column physical address, and a modified address of the row/column memory block.

For master memory blocks located at crosspoints 1/1 and 6/6, the speed expansion method comprises storing a packet destination address into header comparator and speed expansion setting block 212, and enabling an address comparison bit in block 212.

For slave memory blocks located at crosspoints 2/2, 4/4, and 7/7, the speed expansion method comprises disabling an address comparison bit in header comparator and speed expansion setting block 212.

Figure 7:
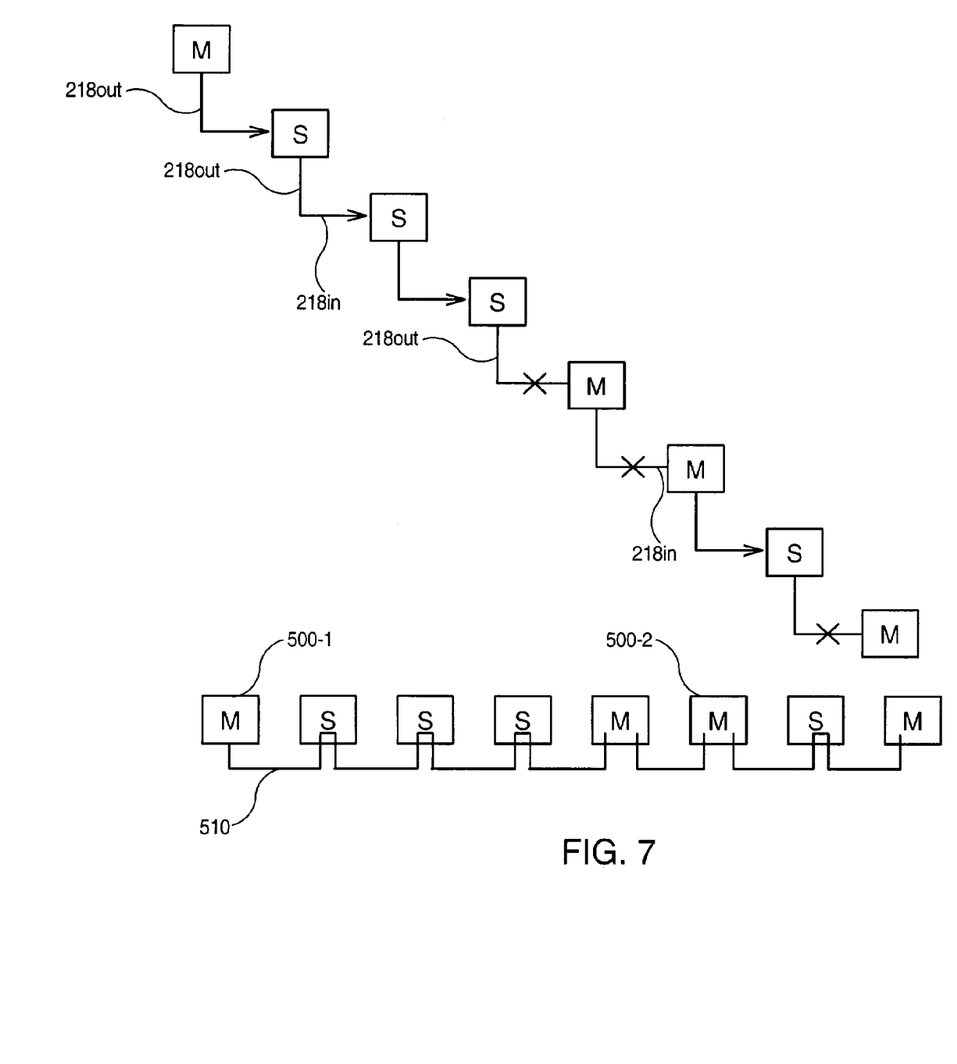
FIG. 7 is a diagram showing the packet switch module of FIG. 6 with a write pulse line linking memory blocks and a link between schedulers in the speed expansion according to one embodiment of the invention.

For storing an incoming data packet in both master and slave memories, in one example memory 226, memory blocks are daisy-chained using signal 218, shown as 218in and 218out in FIG. 7. Signal 218 carries a write pulse generated by master packet validation control block 216 of memory block 200. Each slave of the chain uses this pulse to store an incoming data packet into its memory 226. The next master encountered in the chain ignores and blocks this write pulse and therefore opens the chain. At this stage, data bytes are stored into memory 226.

The process of reading memories, in one example memory 226, is performed by schedulers, in one example scheduler 500. Configuration interface mechanism 600 configures the schedulers corresponding to crosspoints 1/1 and 6/6 as masters, and the schedulers corresponding to crosspoints 2/2, 3/3, 4/4, and 7/7 as slaves. When master memory block 200 detects a destination address as a valid address, it performs actions comprising generating a write pulse onto signal 218 such that each memory block, of both the master and slaves, stores the incoming bytes, and informing the master scheduler of an incoming data packet.

The schedulers are daisy-chained using signal 510 as shown in FIG. 7. Master scheduler 500-1 takes control of the first four columns 1, 2, 3, and 4 by generating a read pulse onto signal 510 which is transmitted to daisy-chained slave schedulers. In a similar manner, master scheduler 500-2 takes control of columns 6 and 7 by generating a read pulse onto signal 510.

Referring once again to FIG. 6, for data packet transfer, high speed adapter 1, corresponding to input ports 1, 2, 3, and 4, sends a data packet with a destination address in its header as follows:

Byte 0 of the data packet from adapter 1 is received on input port 1;

Byte 1 of the data packet from adapter 1 is received on input port 2;

Byte 2 of the data packet from adapter 1 is received on input port 3 ;

Byte 3 of the data packet from adapter 1 is received on input port 4.

In a similar manner, high speed adapter 3, corresponding to input ports 6 and 7, sends a data packet with a destination address in its header as follows:

Byte 0 of the data packet from adapter 3 is received on input port 6;

Byte 1 of the data packet from adapter 3 is received on input port 7.

When a master scheduler, for example 500-1 or 500-2 as shown in FIG. 7, generates a read pulse onto signal 510, each memory, in one example memory 226, of all linked memory blocks outputs the data bytes which are then transferred to a corresponding output port.

In a single module configuration, the function of back-pressure mechanism 900 shown in FIG. 5 is to generate back-pressure signals to the input adapters to stop, or reduce, the flow of data packets transmitted to the packet switch when there is an excessive packet overflow detected by one or more schedulers. The back-pressure signals are generated on bus 922, and are comprised of m independent signals (one per input port) after receiving flow control information from overflow mechanism 700 through bus 910. Back-pressure mechanism 900 communicates information to overflow mechanism 700 using bus 915.

When a memory block is not able to store any more data packets, an overflow control signal is sent to a corresponding scheduler using bus 236. The scheduler alerts overflow mechanism 700 using control bus 710. The overflow mechanism receives overflow control signals from the schedulers and informs the back-pressure mechanism 900 using bus 910 to back-pressure corresponding adapters.

In a port expansion configuration, back-pressure mechanism 900 receives overflow information from a right adjacent switch module on bus 924, and from a bottom adjacent switch module on bus 925, and sends overflow information to a top adjacent switch module on bus 923 and to a left adjacent switch module on bus 922.

While there have been shown and described what are at present the preferred embodiments of the invention, it will be obvious to those skilled in the art that various changes and modifications may be made therein without departing from the scope of the invention as defined by the appended claims.

What is claimed is:

1. A data transmission system comprising:

a plurality of LANs interconnected by a hub;

a plurality of LAN adapters within said hub connected to said LANs and a packet switch module, wherein a packet transmitted by any of said plurality of LAN adapters to said packet switch module includes a header containing at least a destination address of any of said plurality of LAN adapters to which said packet is to be forwarded, wherein said switch module comprises a plurality of input ports and a plurality of output ports, both being connected to said plurality of LAN adapters, wherein each input port and output port define a crosspoint within said switch module;

a memory block located at each said crosspoint of said switch module, wherein said memory block includes a data memory unit adapted for storing at least one data packet;

memory control means for determining from a header of a received data packet whether said packet is to be forwarded to an output port associated with said crosspoint and for storing said data packet into said data memory unit;

data control means for causing at a clock time a data packet stored in a data memory unit of a memory block, among all memory blocks corresponding to said output port, to be transferred to said output port; and a configuration interface mechanism adapted for sending configuration data to said memory control means of said memory blocks, wherein a packet received by a plurality of input ports from an input adapter having a speed n times faster than an input adapter transmitting to a single input port is transferred to a corresponding plurality of output ports at a speed which is n times the transfer speed between one input port and one output port, wherein n is a number of the memory blocks which are located at the crosspoints.

2. The data transmission system of claim 1, wherein said configuration data received from said configuration interface mechanism comprises information that said memory blocks are in speed expansion mode and designates a memory block located at crosspoint x/y as being a master memory block and memory blocks located at crosspoints x+1/y+1. . . , x+n−1/y+n−1 as being slave memory blocks, wherein x, x+1, . . . , x+n−1 designates a rank of a row of the input port, and wherein y, y+1, . . . , y+n−1 designates a rank of a column of the output port.

3. The data transmission system of claim 2, wherein said memory control means of each said memory block comprises a header comparator and speed expansion setting block, wherein an address comparison bit in said header comparator and speed expansion setting block is adapted to be enabled if said memory block is a master memory block and adapted to be disabled if said memory block is a slave memory block, wherein said header comparator and speed expansion setting block of said master memory block is adapted to store a packet destination address.

4. The data transmission system of claim 3, wherein said memory control means of each said memory block further comprises a packet validation control block, wherein said packet validation control block of said master memory block is adapted to generate a write pulse, wherein said write pulse is adapted to be transmitted to memory blocks designated as slave memory blocks using a daisy chain, wherein said slave memory blocks are adapted to use said write pulse to store an incoming data packet in respective data memory units of said slave memory blocks.

5. The data transmission system of claim 4, wherein a next master memory block encountered in said daisy chain is adapted to ignore and block said write pulse.

6. The data transmission system of claim 2, wherein said data control means further comprises a plurality of schedulers respectively associated with each said output port and adapted to select a memory block at a clock time, among all memory blocks corresponding to said output port, and to cause said memory block to transfer a data packet stored in said memory block to said output port.

7. The data transmission system of claim 6, wherein a scheduler corresponding to a master memory block is designated as a master scheduler, wherein a scheduler corresponding to a slave memory block is designated as a slave scheduler, wherein said master scheduler is adapted to generate a read pulse which is transmitted to said slave schedulers using a daisy chain, wherein said master scheduler and said slave schedulers are adapted to cause data bytes stored in said master memory block and said slave memory blocks to be transferred to corresponding output ports.

8. The data transmission system of claim 6, wherein said memory control means is adapted to send an overflow signal to a scheduler of said plurality of schedulers when said memory control means detects an overflowing data memory unit at a memory block corresponding to said scheduler.

9. The data transmission system of claim 8, further comprising an overflow bus adapted to transport a data packet to a data memory unit of another memory block corresponding to said output port after said scheduler has prevented said data packet from being stored into said overflowing data memory unit and has selected and validated said data memory unit of another memory block which is not overflowing.

10. The data transmission system of claim 8, further comprising a back pressure mechanism adapted to send back pressure signals to at least one input adapter, wherein said back pressure signals are adapted to reduce the flow of data packets transmitted to said packet switch module when an excessive packet overflow is detected by at least one scheduler of said packet switch module.

11. The data transmission system of claim 1, further comprising a plurality of output control blocks respectively connected to each said output port and adapted to store a data packet received from any of said memory blocks and to transmit said data packet to said output port.

12. The data transmission system of claim 1, further comprising a plurality of input control blocks respectively connected to each said input port and adapted to buffer a data packet received from said input port before transmitting said data packet over a distributed data bus connected to all said memory blocks corresponding to said input port.

13. The data transmission system of claim 1, wherein said packet switch module further comprises a plurality of switch modules, wherein each bottom adjacent switch module of said plurality of switch modules includes an input expansion data block adapted to buffer a data packet received using an expansion bus connected to a top adjacent switch module of said plurality of switch modules, wherein said bottom adjacent switch module and said top adjacent switch module correspond to a same output port.

* * * * *